No. 694,216. Patented Feb. 25, 1902.
E. E. THRESHER.
INDESTRUCTIBLE BIRD TARGET.
(Application filed Aug. 31, 1898. Renewed July 24, 1901.)
(No Model.) 2 Sheets—Sheet 1.
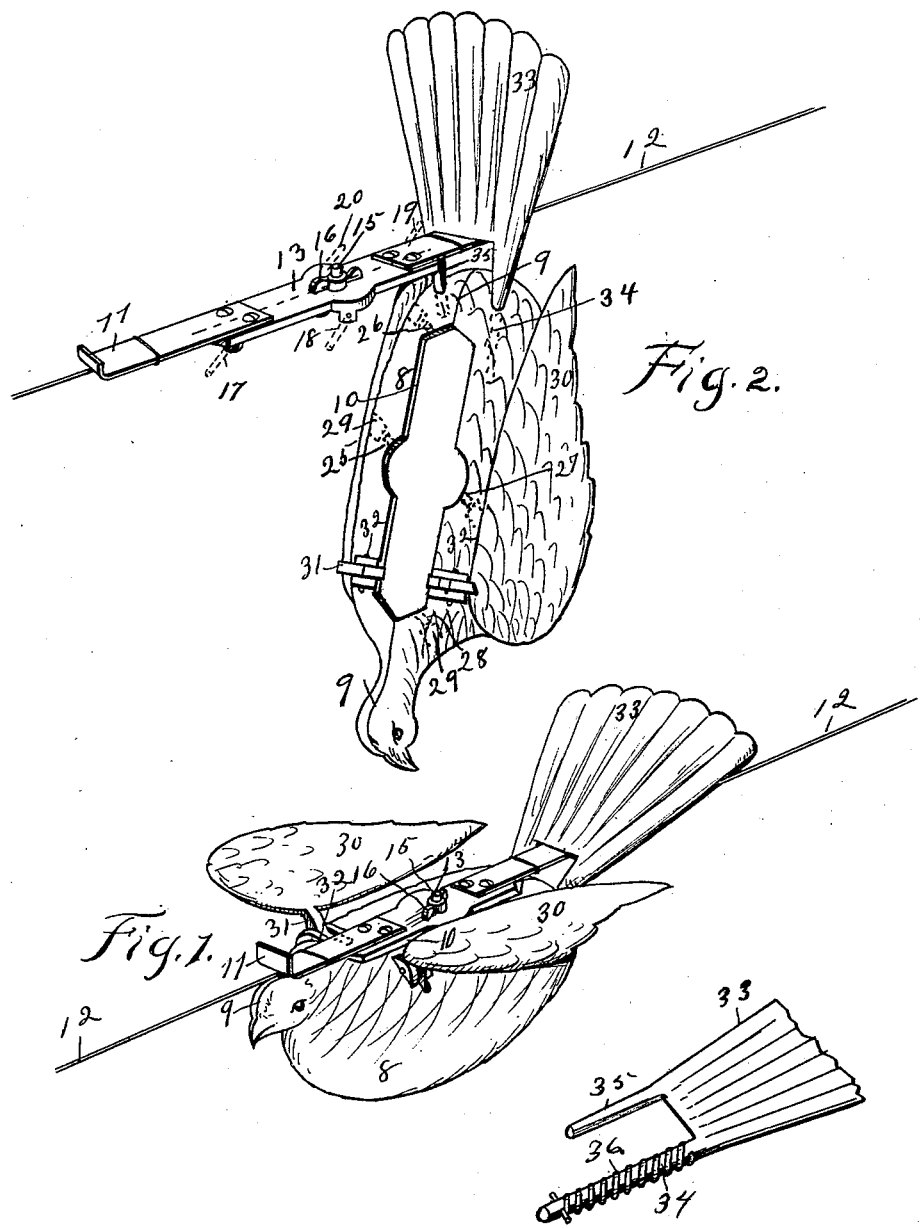

No. 694,216. Patented Feb. 25, 1902.
E. E. THRESHER.
INDESTRUCTIBLE BIRD TARGET.
(Application filed Aug. 31, 1898. Renewed July 24, 1901.)

(No Model.) 2 Sheets—Sheet 2.

WITNESSES: INVENTOR:
Clara Williams Edward E. Thresher,
Henry G. M. Howard. BY Lucius C. West,
ATTORNEY.

UNITED STATES PATENT OFFICE.

EDWARD E. THRESHER, OF KALAMAZOO, MICHIGAN.

INDESTRUCTIBLE BIRD-TARGET.

SPECIFICATION forming part of Letters Patent No. 694,216, dated February 25, 1902.

Application filed August 31, 1893. Renewed July 24, 1901. Serial No. 69,573. (No model.)

*To all whom it may concern:*

Be it known that I, EDWARD E. THRESHER, a citizen of the United States, residing at Kalamazoo, in the county of Kalamazoo, State of Michigan, have invented a new and useful Indestructible Bird-Target, of which the following is a specification.

This invention relates to indestructible representatives of living birds to be used for trap-shooting. They are designed to take the place of live birds in trap-shooting tournaments, thereby doing away with the cruelty exhibited by sportsmen in live-bird shooting. These indestructible birds are also designed to take the place of the so-called "pigeons" or "targets" made of clay, which are now used by many sporting-clubs.

The principal feature of this invention is to produce a target made of aluminium or other suitable metal in the form of a pigeon or bird and so constructed and carried from one point to another that when shot it will collapse and drop with its wings hanging down, thus indicating a kill, (in other words, that the target has really been hit;) but at the same time the body of the bird will be suspended by its tail on the carrier-plate to its destination, from which point it is to be reversed and sent in another direction.

Figure 4:
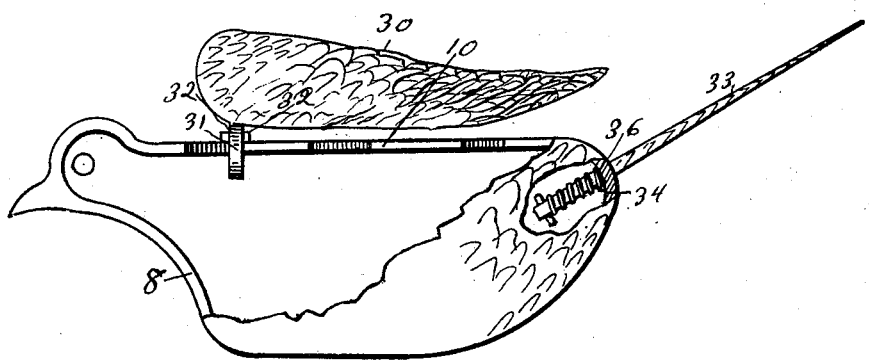
Figure 5:
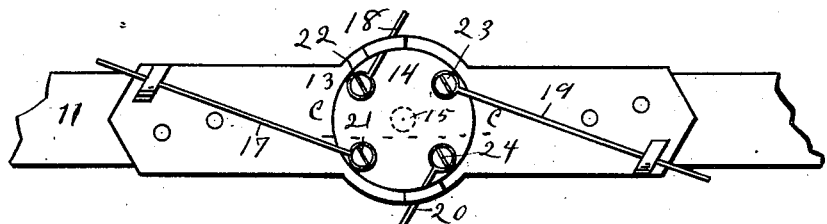
Figure 6:
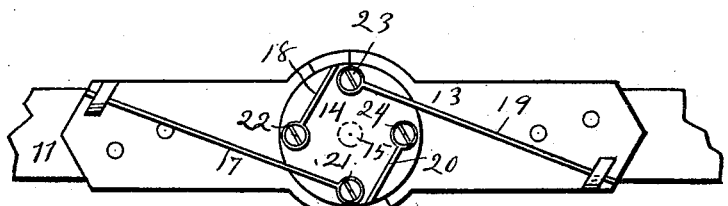
Figure 7:
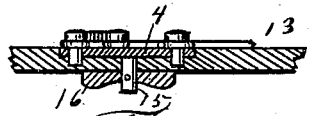

In the drawings forming a part of this specification, Figure 1 is a perspective view of the bird-target as when mounted upon its carrier-bar and being moved from one destination to another, during which transit of the bird the sportsman is to shoot. Fig. 2 is a perspective representation of the bird after having been hit and in its collapsed condition carried by the tail; Fig. 3, a detached perspective view of the tail; Fig. 4, a side elevation of the bird with parts broken away, showing construction; Fig. 5, an enlarged broken plan of the carrier-bar in Fig. 1 as when attached to the body of the bird, but being inverted in Fig. 5; Fig. 6, same as Fig. 5, but as before attachment to the bird; and Fig. 7 is a section on line *c c* in Fig. 5, and the same would be an enlarged section, but inverted, on the same parts in Fig. 1.

Referring to the parts of the drawings pointed out by numerals, 8 is the hollow body of the bird-target, made in two halves and then put together, the separation of which halves or the division is indicated by the line 9 in Figs. 1 and 2. Each half is provided with a cut-away portion in the top, which when the halves are put together, as in Figs. 1 and 2, form a slot 10 to receive the locking part of the carrier-bar 11.

It is the design to send or move the bird-target from one point or station to another by means of a suspended traveling wire or cable 12, Figs. 1 and 2. The carrier-bar 11 is supported on this cable 12, and the central part 13 of the carrier-bar 11, which is a little lower than the ends of said carrier 11, is passed into the slot 10 and detachably locked or attached therein as follows: Coupled to the lock portion 13 of this carrier-bar 11 is a revoluble disk 14, Figs. 5 and 6, said disk having a stem or axis 15, extending up through the lock part 13 of the carrier-bar 11, as in Figs. 1, 2, and 7, said stem 15 being provided with a thumb-head 16 to turn it by by taking hold of said thumb-head with the thumb and finger when locking the body of the target-bird to the carrier-bar. Lock-rods 17, 18, 19, and 20 are pivotally attached to the revoluble disk 14 at 21, 22, 23, and 24. These lock-rods extend in different tangential directions from the periphery of the disk 14 to such points as will admit of their outer ends catching under the body of the target-bird at the edges of the slot 10. In Fig. 5 the ends of the lock-rods are thrown out as they would be when supporting the body of the bird. These ends of the lock-rods are dotted in at 25, 26, 27, and 28 in Fig. 2. At these ends of said lock-rods are shoulders 29, internally in the body of the bird and shown dotted in Fig. 2, and against which shoulders the ends of the lock-rods contact when the target-bird is shot, as explained in the operation.

The wings 30 of the bird are pivoted to the body by means of arms 31, pivoted at 32, Figs. 1, 2, and 4. The inner ends of these arms 31 catch under the carrier plate or bar 11, as in Fig. 1, when the body of the bird is attached, so as to hold the wings up as in the position of a bird flying.

The tail 33 of the bird-target is provided with a long prong 34 and a short prong 35 in the manner of a hairpin, and these prongs are inserted into holes in the rear end of the body, as in Figs. 2 and 4, the detached tail itself being shown in Fig. 3. The long prong 34 is provided with a spring 36, so that the tail will be held in place and at the same time be capable of being pulled out and reversed or turned over (the short prong coming out of its hole and the long one remaining in its hole) when reversing the bird to send it in another direction. The tail hangs on the carrier-bar on the surface between the two prongs of said tail, as in Fig. 2, when the bird drops after being hit by the sportsman.

It will be noticed by reference to Fig. 1 that the slot 10 is larger than that part of the carrier-bar in and over said slot. For this reason when the target-bird is hit by the sportsman at any point the body of the target-bird will be moved or thrown in the opposite direction from said point of hitting, and this will cause one of the shoulders 29 to push on its particular locking-rod, which action will turn the disk 14 and draw in all the other locking-bars. To illustrate: In the operation I first raise the bird-target, as in Fig. 1, and turn the disk 14 so as to throw the ends of the locking-rods 17, 18, 19, and 20 out, as in Fig. 5, thus catching them under the upper edges of the body each side of the slot 10, as in Fig. 2 at 25, 26, 27, and 28, as before explained. When, as stated, the bird-target is hit the disk 14 will turn in the other direction and release the outer ends of the locking-rods from engagement with the body and the same will fall, as in Fig. 2.

Having thus described my invention, what I claim, and desire to secure by Letters Patent of the United States, is—

1. An indestructible movable target, suspended by wire or cable, said target constructed to change its position and condition to indicate a kill when disturbed by contact of the missile shot, without destroying the target for further use, substantially as set forth.

2. The combination of a representation of an indestructible bird-target, means for detachably attaching it to a traveling suspending means, and a reversible tail for suspending it on the suspending means after the bird-target drops, substantially as set forth.

3. A traveling suspended wire or cable, a carrier-plate attached to said cable, a bird-target adapted to be detachably attached to said carrier-plate, a reversible tail astride of the carrier-plate and wings pivoted to the body and having arms adapted to catch under the carrier-plate to hold the wings up until the bird-target falls, at which time the wings also fall, all combined, substantially as set forth.

4. The combination of the hollow indestructible bird-target having the top slot, a carrier-plate smaller than the slot, a revoluble disk attached to the carrier-plate and locking-rods pivotally attached to the disk and adapted to detachably engage the under side of the edges of the slot in top of the bird-target, substantially as set forth.

In testimony of the foregoing I have hereunto set my hand in the presence of two witnesses.

EDWARD E. THRESHER.

Witnesses:
E. C. DAYTON,
W. R. BEEBE.